Figure 1:
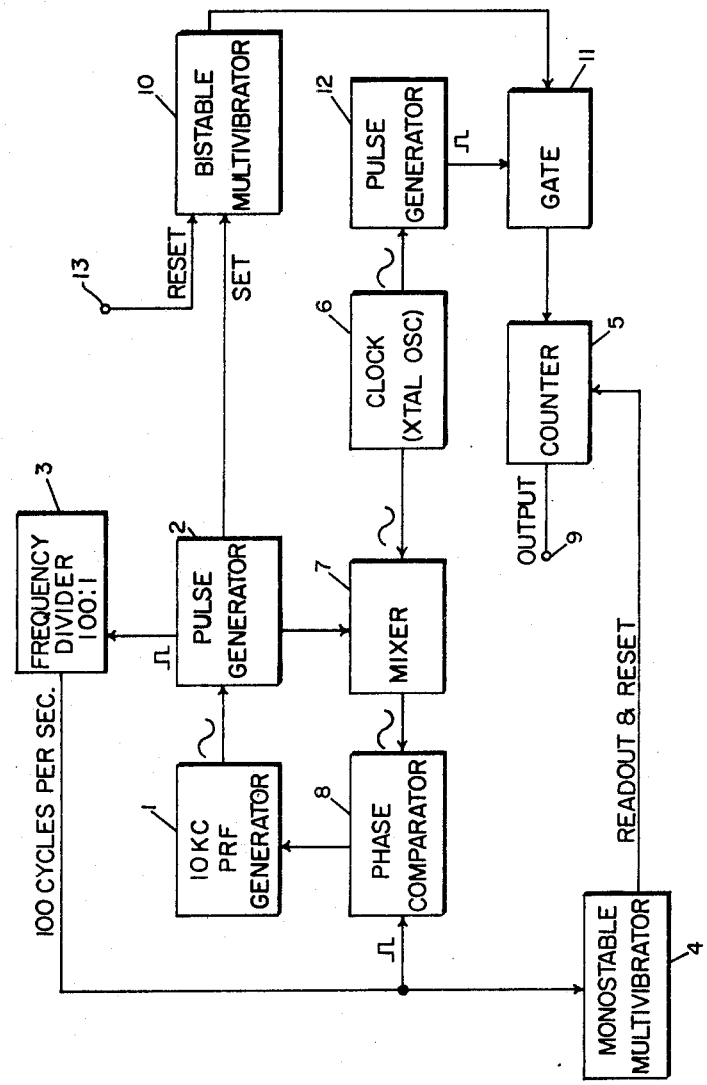

Alfred J. Cann
*INVENTOR*

Oct. 11, 1966

A. J. CANN 3,278,845

SYSTEM FOR MEASURING A RECURRING TIME INTERVAL
UTILIZING THE VERNIER PRINCIPLE

Filed Dec. 5, 1961

2 Sheets-Sheet 2

Alfred J. Cann
INVENTOR

United States Patent Office 3,278,845
Patented Oct. 11, 1966

3,278,845
SYSTEM FOR MEASURING A RECURRING TIME INTERVAL UTILIZING THE VERNIER PRINCIPLE
Alfred J. Cann, Westford, Mass., assignor to Sanders Associates, Inc., Nashua, N.H., a corporation of Delaware
Filed Dec. 5, 1961, Ser. No. 162,304
3 Claims. (Cl. 324—68)

This invention relates in general to apparatus for the measurement of time and more particularly relates to time measuring instruments employing the vernier principle to obtain increased accuracy.

In conventional digital time measuring devices, periodic timing markers, such as a train of pulses, are generated, and the time measurement is made by counting the number of pulses occurring during the interval being measured. The accuracy of those devices depends upon the rate at which the timing markers are generated; the higher the rate, the greater the accuracy. Where the interval under measurement is short, the measurement has low accuracy unless a very high marker counting rate is used.

In some situations, the intervals to be measured recur periodically, for example, as in a radar system where a pulse is transmitted at regular intervals and the measurement being made is the elapsed time between the transmitted pulse and the reception of an echo from that pulse. It is often the case in such situations that the required data rate is much less than the recurrence frequency of the intervals to be measured that is, it is not required to know the elapsed time between very transmitted pulse and its echo; the elapsed time between every fiftieth or one-hundredth pulse and its echo may provide sufficient information. The invention takes advantage of the time available in those cases to provide a high measurement accuracy with apparatus employing a moderate counting rate.

The invention improves the accuracy of time measurement obtained by conventional devices by a factor dependent on the required data rate and the recurrence frequency of the interval to be measured. In effect, the time interval to be measured is expanded by a factor N so that N times as many timing pulses as are used in conventional devices are counted for the interval to be measured. This is equivalent to increasing the frequency of marker pulses and thus the accuracy of the measurement by the same factor, N.

The invention resides in a system for accurately measuring a recurring time interval whose inception can be controlled. The invention employs a clock mechanism to provide periodic electrical marker pulses, the interval from one marker pulse to the next constituting the basic time unit. The recurring time interval is initiated by periodic signals from a generator. In the preferred embodiment of the invention, the generator is maintained in a phased relationship with regard to the clock mechanism such that the phase of the time interval is shifted by a fixed amount relative to the marker pulses upon each recurrence of the time interval. A gating signal is generated which is coterminous with the time interval being measured. The gating signal, while it subsists, enables a coincidence gate to pass the marker pulses from the clock mechanism to a counter. A measurement of the time interval is performed when the counter registers the number of marker pulses passed to it during that interval. A number of measurements of the recurring time interval are made such that the time interval is shifted nearly 360° in phase relative to the marker pulses during the performance of those measurements. The total number of pulses registered in the counter as a result of the measurements made during the nearly 360° phase shift can then be averaged to more accurately ascertain the length of the time interval.

Figure 2:
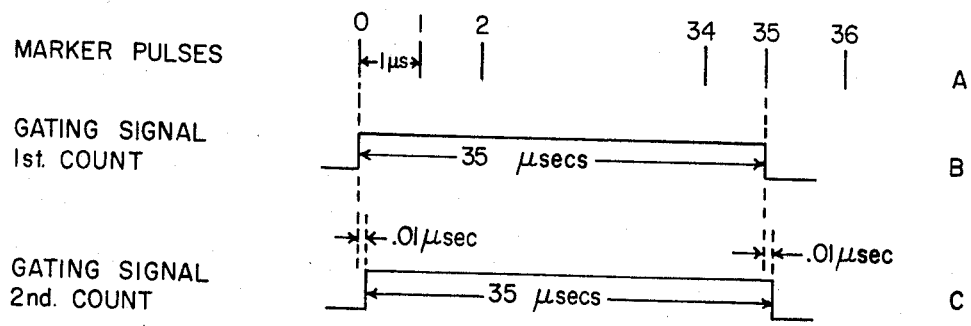
Figure 3:
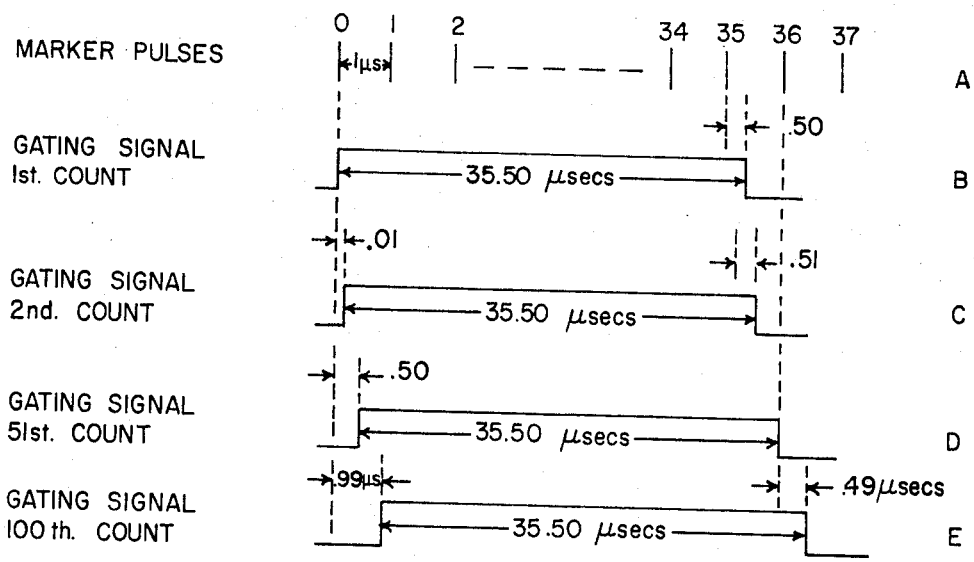

The invention, both as to its arrangement, construction, and mode of operation can be better apprehended by a perusal of the following exposition when considered in conjunction with the accompanying drawings wherein:

FIG. 1 is the schematic arrangement of the preferred embodiment of the invention; and FIGS. 2 and 3 are timing diagrams showing the occurrence of gating signals in their relation to the marker pulses provided by the system's clock mechanism.

Referring now to FIG. 1, there is depicted, in diagrammatic form, a time measuring system which reduces quantizing errors and thereby achieves high accuracy with a relatively low counting rate. For the purpose of exposition, it is assumed that it is desired to measure in the range of 0 to 60 microseconds to an accuracy of .01 microsecond and that the intervals to be measured recur at the rate of 10,000 per second, that is, a recurrence takes place every 100 microseconds. By the conventional counting technique, if a counting rate of one megacycle per second (1 mc.) is used, each measurement has an accuracy of one microsecond because fractions of a microsecond are ignored. In the system of FIG. 1, pulse repetition frequency (P.R.F.) generator 1 is an oscillator which determines the rate of occurrence of the intervals to be measured by providing sinusoidal signals varying at the rate of ten kilocycles per second (10 kc.) to pulse generator 2. In response to the sinusoidal output of generator 1, a train of periodic pulses occurring at 10 kc. is produced by pulse generator 2. The 10 kc. pulse output of generator 2 is reduced in frequency divider 3 to a train of periodic pulses having a frequency of 100 pulses per second. The output of divider 3 is applied to the input of a monostable multivibrator 4 so as to cause the multivibrator to furnish a reset signal to counter 5. The counter, therefore, is permitted to accumulate a count for .01 second and is then reset by multivibrator 4. For a suitable frequency divider and counter, the reader is referred to Chapter 11 of Pulse and Digital Circuits by Millman and Taub, published by McGraw Hill.

Oscillator 6 is the system's clock and preferably is a crystal-controlled oscillator as it is essential that the oscillator be stable in frequency. The clock frequency is set at 1 mc. Mixer 7 and phase comparator 8 lock the phase of P.R.F. generator 1 so that its 100th harmonic is 100 cycles per second away from the 1 mc. clock frequency. To obtain that 100 c.p.s. difference, generator 1 is set to oscillate at slightly higher than 10,001 c.p.s. The 100th harmonic of generator 1, having a frequency of 1,000,100 c.p.s., is obtained from pulse generator 2 and is heterodyned in mixer 7 with the 1 mc. output of clock 6 to produce a 100 c.p.s. beat frequency. The mixer, it should be noted, mixes the 1 mc. sine wave and a short pulse having a 10 kc. P.R.F. Such a mixing operation is sometimes called a sampling operation. The mixer output is a series of samples of the 1 mc. sine wave amplitude at intervals of approximately 100 microseconds. These samples will trace out a low frequency sine wave whose frequency is the difference between 1 mc. and the nearest harmonic of the 10 kc. P.R.F (in this case 100 c.p.s.). Low pass filtering action is performed by the output capacitor of the mixer 7 and by loading due to the input impedance of phase comparator 8. The approximately 100 c.p.s. output of divider 3 is fed into comparator 8 where its phase is compared with the phase of the 100 c.p.s. output of mixer 7. The comparator's output is such as to supply a correction signal to generator 1 causing the oscillations of that generator to tend toward a constant phase relation between the two inputs to the comparator 8.

Phase comparator 8 is a device which is sometimes termed a "phase detector." The phase comparator may be of the type shown on page 387 of Pulse and Digital Circuits. That device is capable of comparing the phase of a sinusoidal signal with the phase of recurring pulses and provides a D.C. output signal indicative of the phase difference and the sense of that difference. The output of phase comparator 8 is used to control the frequency of the sinusoidal oscillations of repetition frequency generator 1 in the manner described on pages 388 to 390 of Pulse and Digital Circuits.

The period of a complete cycle of the beat frequency is 10,000 microseconds ($\mu$s.), and the period of a complete cycle 10.001 kc. oscillator 1 is 100 microseconds. Therefore, where the generator 1 and clock 6 are continuously running oscillators, the phase of the clock's oscillations is advanced relative to the phase of oscillator 1 by 100/10,000, viz., .01, microseconds per pulse repetition interval. In other words, the starting phase of oscillator 6 relative to the starting phase of oscillator 1 advances nearly 360° during the time that 100 consecutive time measurements are made. Assuming 100 consecutive time measurements are to be made, counter 5 registers the total of the 100 measurements, and when reset by a signal from multivibrator 4, provides the totalled count at output 9.

The commencement of a time measurement is initiated by each pulse from generator 2. The pulse output of generator 2 is applied to the "set" input of bistable multivibrator 10, causing the output of that multivibrator to provide an enabling gating signal to gate 11. Upon being enabled, gate 11 passes the marker pulses from generator 12 to the input of counter 5. Generator 12 provides a train of periodic marker pulses occurring at the clock frequency; the marker pulses, therefore, occur at the 1 mc. rate. At the end of the interval to be measured, a stop signal is applied at terminal 13 which resets bistable multivibrator 10. Where the measurement system is used in a pulse radar system, reception of the reflected signal (the echo) marks the end of the interval. Upon being reset, multivibrator 10 discontinues emitting an enabling signal, thereby causing gate 11 to be inhibited. The inhibition of gate 11 prevents the marker pulse output of generator 12 from passing through to the counter so that the counter ceases to count as soon as gate 11 is inhibited. The next pulse from generator 2 then commences another time measurement cycle. At the end of 100 such measurement cycles, monostable multivibrator 4 is actuated by an output from divider 3 and emits a signal to counter 5 which causes that counter to be reset. Upon being reset, the counter presents the total of the 100 time measurements at output 9 and is cleared to zero in preparation for the next time measurement.

*Operation*

Consider the situation in which multivibrator 10 emits a gating signal having a duration of precisely thirty-five microseconds (35 $\mu$secs.). Such a situation is illustrated in FIG. 2, where the leading edge of the gating signal (FIG. 2B) is shown to occur just as marker pulse 0 (FIG. 2A) decays and the trailing edge is contemporaneous with marker pulse 35. Ideally, gate 11 would exclude marker pulse 0 and permit marker pulses 1 to 35, inclusive, to pass to counter 5. Since each pulse represents an interval of one microsecond, the counter would register 35 pulses, thus accurately indicating the time interval to be 35 microseconds long. Ambiguity can occur, however, because the leading edge of the gating signal is nearly contemperaneous with a marker pulse and the gate may permit marker pulse 0 to pass to the counter. If the phase of the gating signal is shifted a fraction of a microsecond relative to the marker pulses as indicated in FIG. 2C, the second count is unambiguous as only 35 pulses can pass to the counter. Thus, where the first count is ambiguous, the ambiguity is removed by shifting the gating signal .01 $\mu$secs. relative to the marker pulses and taking another count. If the gating signal is shifted .01 $\mu$secs. prior to each count, ninety-nine counts can be performed after the initial count before the ambiguous condition recurs. The ambiguous condition recurs when the gating signal has been shifted 1 microsecond relative to the marker pulses. That ambiguous condition, therefore, recurs on the one-hundredth and first count. By resetting counter 5 (FIG. 1) after the one-hundredth count, an error due to the ambiguity of one count is averaged over the hundred counts.

Consider now the situation where multivibrator 10 (FIG. 1) emits a gating signal (FIG. 3B) to gate 11 (FIG. 1) just as marker pulse 0 (FIG. 3A) decays. Assuming marker pulse 0 fails to pass gate 11, the time interval between the leading edge of the gating signal and marker pulse 1 is one microsecond. The gating signal, it is assumed, has a duration of 35.50 microsecond. After thirty-five microseconds, pulses 1 to 35 inclusive will have passed into counter 5 (FIG. 1). Since the gating signal (FIG. 3B) terminates one-half microsecond after pulse 35, the .50 $\mu$sec. interval between marker pulse 35 and the end of the gating signal is not counted.

Whereas the gating signal actually exists for 35.50 $\mu$secs., counter 5 records only 35 pulses so that the reading in the counter is low by .50 $\mu$secs. The phase of the next gating signal (FIG. 3C) is now shifted by .01 $\mu$secs. relative to the clock pulses. The leading edge of the gating signal, therefore, occurs .01 $\mu$secs. after clock pulse 0 and clock pulse 1 actually represents an interval of .99 $\mu$sec. The time interval between pulse 1 and pulse 35 is 34 $\mu$secs. and the trailing edge of the gating signal occurs .51 $\mu$secs. after marker pulse 35. Since only pulses 1 to 35, inclusive, enter counter 5, the second count is low by .50 $\mu$sec. The phase of each successive gating signal is shifted by another .01 $\mu$sec. relative to the clock pulse. At the 51st count, the position of the gating signal relative to the marker pulses is indicated by FIG. 3D. The leading edge of the gating signal occurs .50 $\mu$secs. after marker pulse 0 and the trailing edge of the gating signal is contemporaneous with pulse 36. Therefore, pulse 1 to 36 enter the counter, indicating an interval of 36 $\mu$secs., whereas the actual interval is 35.50 $\mu$secs. The count, therefore, is high by .50 $\mu$secs. From the 51st to the 100th count, each count is high by .50 $\mu$secs. Since each of the 1st to 50th count was low by .50 $\mu$secs., the average of the 100 counts is an accurate measurement of the actual interval occupied by the gating signal. After 100 counts have been made, multivibrator 4 (FIG. 1) clears pulse counter 5 in preparation for the next measurement.

While a preferred embodiment of the invention has been described, it is evident to those skilled in the electronics art that modifications can be made which do require ingenuity and do not change the essential nature of the system described herein. For example, the manner of locking the phase of repetition frequency generator 1 to the oscillations of clock 6 to obtain the desired relationship can be accomplished by other types of "phase-lock" loops. In some types of "phase-lock" loops, the mixer 7 may not be required. It is intended that the foregoing exposition shall be an exemplar of the invention and that the scope of the invention not be limited thereby but shall be construed in accordance with the appended claims.

I claim:
1. A time measuring system comprising
 (a) means for periodically furnishing marker pulses,
 (b) means for periodically initiating a gating signal whose duration is to be measured,
 (c) means for shifting the phase of said gating signal relative to said marker pulses and said phase shifting means coupled to said marker pulse producing means,
 (d) a pulse counter, and
 (e) a gate having its output coupled to an input of said counter, said gating signal and the marker pulses being applied to the gate whereby the marker pulses are permitted to pass to the counter during said time said gate is enabled by the gating signal, and (f) means for accumulating counts in said pulse counter for a plurality of operations of the gate circuit.

2. A time measuring system comprising
   (a) a clock for periodically furnishing electrical marker pulses,
   (b) a generator for periodically emitting signals at a rate lower than the rate of occurrence of said marker pulses,
   (c) means responsive to each signal from said generator for initiating a gating signal whose duration is to be measured,
   (d) means responsive to said clock and said generator for periodically shifting by a fixed amount said phase of said gating signal relative to said marker pulse, said means being coupled to the marker pulse furnishing means,
   (e) a pulse counter,
   (f) a gate having its output coupled to an input of said counter,
   (g) means for applying said gating signal and said marker pulses to said gate whereby said marker pulses are passed to the counter when said gate is enabled by said gating signal, and
   (h) means for accumulating counts in said pulse counter for a plurality of operations of the gate circuit.

3. Apparatus for measuring a recurring interval comprising:
   (a) a clock for periodically furnishing electrical marker pulses,
   (b) a generator for periodically emitting signals,
   (c) means responsive to signals from said generator occurring at a rate substantially lower than the rate of occurrence of said marker pulses for intiating a recurring gating signal whose duration is to be measured,
   (d) means responsive to said clock and said generator for periodically shifting said phase of said gating signal by a fixed amount relative to said marker pulses, said means being coupled to the marker pulse furnishing means,
   (e) a pulse counter,
   (f) a coincidence gate having its output coupled to the counter's input,
   (g) means for applying said gating signal and said marker pulses to said gate to enable the gate to pass said marker pulses during said existence of said gating signal, and
   (h) means for accumulating counts in said pulse counter for a plurality of operations of the gate circuit, said means including means responsive to said periodic signals of said generator for resetting said counter after a predetermined phase shift of said gating signal relative to said marker pulses has occurred.

References Cited by the Examiner
UNITED STATES PATENTS 3,117,317  1/1964  Kenyon _____ 324—68

WALTER L. CARLSON, *Primary Examiner.*

FREDERICK M. STRADER, *Examiner.*

CHESTER L. JUSTUS, MAYNARD R. WILBUR, C. W. HOFFMANN, M. J. LYNCH,
*Assistant Examiners.*